(12) United States Patent
Wild, III et al.

(10) Patent No.: US 8,223,653 B2
(45) Date of Patent: Jul. 17, 2012

(54) BROADCAST CAPABLE FILE SYSTEM

(75) Inventors: Aloysius Arthur Wild, III, Thousand Oaks, CA (US); Jan R A Olderdissen, Thousand Oaks, CA (US)

(73) Assignee: IXIA, Calabasas, CA (US)

( * ) Notice: Subject to any disclaimer, the term of this patent is extended or adjusted under 35 U.S.C. 154(b) by 2222 days.

(21) Appl. No.: 10/818,823

(22) Filed: Apr. 5, 2004

(65) Prior Publication Data

US 2005/0220103 A1  Oct. 6, 2005

(51) Int. Cl.
*G06F 15/16* (2006.01)
*G06F 17/30* (2006.01)
*G06F 3/00* (2006.01)
*G06F 9/44* (2006.01)
*H04L 12/26* (2006.01)
*H04N 7/173* (2011.01)

(52) U.S. Cl. ........ 370/241; 370/259; 370/312; 370/390; 370/432; 707/705; 707/781; 709/203; 709/217; 709/219; 709/225; 709/229; 715/744; 715/748; 715/753; 717/168; 717/174; 725/86; 725/107; 725/109; 725/114; 725/135

(58) Field of Classification Search .............. 370/241, 370/259, 312, 390, 432; 707/705, 781; 709/203, 709/204, 217, 219, 225, 229, 238; 715/744, 715/748, 753; 717/168, 174; 725/86, 107, 725/109, 114, 135

See application file for complete search history.

(56) References Cited

U.S. PATENT DOCUMENTS

| | | | | |
|---|---|---|---|---|
| 5,561,637 A | * | 10/1996 | Dan et al. | 365/230.03 |
| 5,787,253 A | | 7/1998 | McCreery et al. | |
| 5,974,463 A | * | 10/1999 | Warrier et al. | 709/225 |
| 6,002,852 A | * | 12/1999 | Birdwell et al. | 709/203 |
| 6,041,359 A | * | 3/2000 | Birdwell | 709/238 |
| 6,091,725 A | | 7/2000 | Cheriton | |
| 6,122,670 A | | 9/2000 | Bennett et al. | |
| 6,173,333 B1 | | 1/2001 | Jolitz | |
| 6,233,256 B1 | | 5/2001 | Dieterich et al. | |
| 6,345,302 B1 | | 2/2002 | Bennett et al. | |
| 6,405,239 B1 | * | 6/2002 | Addington et al. | 709/203 |
| 6,415,280 B1 | | 7/2002 | Farber et al. | |
| 6,442,565 B1 | * | 8/2002 | Tyra et al. | 1/1 |
| 6,442,598 B1 | * | 8/2002 | Wright et al. | 709/217 |
| 6,609,184 B2 | * | 8/2003 | Bradshaw et al. | 711/162 |

(Continued)

OTHER PUBLICATIONS

Burden, Peter, Networked File System, website: http://www.scit.wlv.ac.uk/~jphb/comms/nfs.html, 1999.

(Continued)

*Primary Examiner* — Alpus H Hsu
(74) *Attorney, Agent, or Firm* — SoCal IP Law Group LLP; Steven C. Sereboff; Mark A. Goldstein

(57) ABSTRACT

A broadcast capable file system is disclosed. In a method, a server may receive a file request from a requesting client and prepare a broadcast response to the file request. The broadcast response may be directed to a group of clients of which the requesting client is a member. In another method, at least one of the clients of the group of clients may submit a file request to the server. Each of the clients of the group may receive a broadcast response to the file request. The broadcast capable file system may be implemented between a server computing device and multiple client computing devices. The server computing device and multiple client computing devices may be included in a network testing system.

46 Claims, 6 Drawing Sheets

U.S. PATENT DOCUMENTS

| | | | |
|---|---|---|---|
| 6,711,619 B1 | 3/2004 | Chandramohan et al. | |
| 6,718,551 B1* | 4/2004 | Swix et al. | 725/32 |
| 6,748,447 B1* | 6/2004 | Basani et al. | 709/244 |
| 6,918,120 B2* | 7/2005 | Riedel | 719/313 |
| 7,054,941 B2* | 5/2006 | Wang | 709/228 |
| 7,069,572 B2* | 6/2006 | Stalker | 725/34 |
| 7,099,927 B2* | 8/2006 | Cudd et al. | 709/217 |
| 7,120,666 B2* | 10/2006 | McCanne et al. | 709/203 |
| 7,155,160 B2* | 12/2006 | Ichiyoshi | 455/3.02 |
| 7,159,013 B2* | 1/2007 | Cudd et al. | 709/217 |
| 7,275,071 B2* | 9/2007 | Weyrich et al. | 1/1 |
| 7,342,897 B1* | 3/2008 | Nader et al. | 370/255 |
| 7,546,082 B2* | 6/2009 | Chennikara et al. | 455/3.01 |
| 7,546,355 B2* | 6/2009 | Kalnitsky | 709/219 |
| 7,870,283 B2* | 1/2011 | Sedlak et al. | 709/232 |
| 2001/0037365 A1* | 11/2001 | Montague et al. | 709/204 |
| 2001/0039590 A1 | 11/2001 | Furukawa | |
| 2002/0056100 A1 | 5/2002 | Shimomura et al. | |
| 2002/0091816 A1* | 7/2002 | Stalker | 709/224 |
| 2002/0091926 A1* | 7/2002 | Fukutomi | 713/170 |
| 2002/0124069 A1* | 9/2002 | Hatalkar | 709/223 |
| 2002/0129095 A1* | 9/2002 | Hatalkar | 709/203 |
| 2002/0138575 A1* | 9/2002 | Hirata | 709/205 |
| 2002/0165920 A1* | 11/2002 | Keller-Tuberg | 709/204 |
| 2002/0194287 A1* | 12/2002 | Tyra et al. | 709/206 |
| 2003/0009538 A1* | 1/2003 | Shah et al. | 709/219 |
| 2003/0093482 A1* | 5/2003 | Watanabe et al. | 709/206 |
| 2003/0208761 A1 | 11/2003 | Wasserman et al. | |
| 2004/0010612 A1 | 1/2004 | Pandya | |
| 2004/0019612 A1* | 1/2004 | Tyra et al. | 707/104.1 |
| 2004/0030757 A1 | 2/2004 | Pandya | |
| 2004/0030787 A1* | 2/2004 | Jandel et al. | 709/229 |
| 2004/0146052 A1 | 7/2004 | Chang | |
| 2004/0158709 A1* | 8/2004 | Narin et al. | 713/156 |
| 2005/0033822 A1* | 2/2005 | Grayson et al. | 709/217 |
| 2005/0033829 A1* | 2/2005 | Oommen | 709/220 |
| 2005/0198097 A1* | 9/2005 | Kalnitsky | 709/200 |
| 2006/0031557 A1* | 2/2006 | Walsh et al. | 709/232 |

OTHER PUBLICATIONS

Sun Microsystems, Inc., NFS: Network File System Protocol Specification, Network Working Group Request for Comments: 1094, Mar. 1, 1989.

* cited by examiner

BROADCAST CAPABLE FILE SYSTEM

NOTICE OF COPYRIGHT AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The invention relates to network communications, data distribution, and computer file distribution.

2. Description of Related Art

Networks such as the Internet carry a variety of data communicated using a variety of network devices including servers, routers, hubs, switches, and other devices. Before placing a network into use, the network, including the network devices and network applications included therein, may be tested to ensure successful operation. Network devices may be tested, for example, to ensure that they function as intended, comply with supported protocols, and can withstand anticipated traffic demands.

In addition, to assist with the construction, installation and maintenance of networks, network applications and network devices, networks may be augmented with network analyzing devices, network conformance systems, network monitoring devices, and network traffic generators, all which are referred to herein as network testing systems. The network testing systems may allow for analyzing the performance of networks, network applications and network devices by capturing, analyzing and/or sending network communications.

A network testing system may include multiple computing devices, each of which may execute a network testing application. The multiple computing devices may request and receive from a server executable applications, data files and other information that are part of or used by the network testing application and/or the network testing system.

In another environment, multiple computing devices may be configured similarly in a company, school or other entity. That is, each of the multiple computing devices may include and run the same software applications and may require the same files. When a software update of applications and/or data is needed on the computing devices, the computing devices may request and receive executable applications, data files and other information from a server.

DETAILED DESCRIPTION OF THE INVENTION

Throughout this description, the embodiments and examples shown should be considered as exemplars, rather than limitations on the apparatus and methods described.

Description of the System

Figure 1:
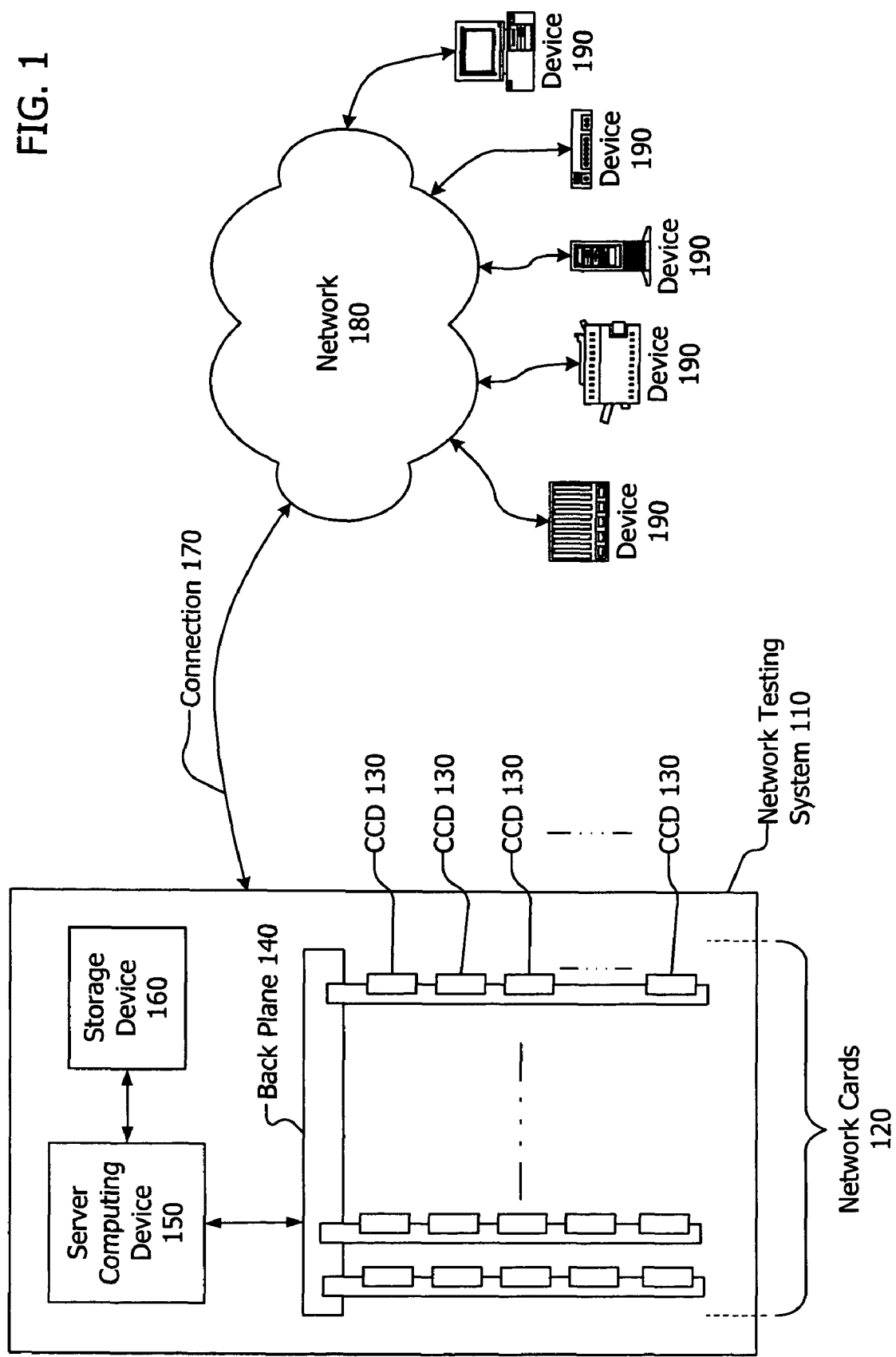
FIG. 1 is a block diagram of a first environment in which a broadcast capable file system may be implemented.

FIG. 1 is a block diagram of a first environment in which a broadcast capable file system may be implemented. The environment includes network testing system 110 coupled to a network 180 via connection 170. The network testing system 110 may include, have the functionality of, or be one or more of a performance analyzer, a packet blaster, a conformance validation system, a network analyzer, a network management system, and/or others.

The network testing system 110 may be in the form of a chassis or card rack, as shown in FIG. 1, and may be an integrated unit. Alternatively, the network testing system may comprise a number of separate units such as two or more chassis cooperating to provide network analysis, network conformance testing, and other network testing system tasks. The chassis of the network testing system 110 may include one or more network cards 120 and a server computing device 150 all of which are coupled to a back plane 140. Each network card 120 may include multiple client computing devices (CCDs) 130. In various embodiments, each network card 120 includes 2, 4, 8, 12, 16, 32 or more CCDs 130. In one embodiment, each of the CCDs 130 on the network cards 120 may be synchronized; that is, all of the CCDs 130 may be synchronized with one another such that they begin execution or operation at the same time. In another embodiment, CCDs 130 may be grouped such that each of the CCDs 130 in the group are synchronized. The chassis of the network testing system 110 and/or one or more of the network cards 120 and/or one of more of the CCDs 130 may be coupled to the network 180 via one or more connections 170. The network cards 120 may be permanently installed in the network testing system 110, may be removable, or may be a combination thereof.

The server computing device 150 may have a storage device 160 coupled thereto. Storage device 160 may be a hard disk drive or other storage device. As used herein a storage device is a device that includes and may be used to read from and write to a storage medium. Storage devices include, hard disk drives, digital versatile disk (DVD) drives, compact disk (CD) drives, micro-drives, flash memory devices, and others. Storage media include, for example, magnetic media such as hard disks, floppy disks and tape; optical media such as CDs and DVDs; flash memory cards; and any other storage media.

The server computing device 150 and/or one or more of the network cards 120 and/or one or more of the CCDs 130 may include an operating system such as, for example, versions of Linux, Unix and Microsoft Windows.

The server computing device 150 and/or one or more of the network cards 120 and/or one or more of the CCDs 130 may support one or more well known higher level communications standards or protocols such as, for example, one or more versions of the User Datagram Protocol (UDP), the Transmission Control Protocol (TCP), and the Internet Protocol (IP); may support one or more well known lower level communications standards or protocols such as, for example, the 10 and/or 40 Gigabit Ethernet standards, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI); may support proprietary protocols; and may support other protocols. The server computing device 150, each of the network cards 120, and/or each of the CCDs 130 may support a single communications protocol, may support a number of related protocols, or may support a number or combination of unrelated protocols.

The term "network card" encompasses line cards, test cards, analysis cards, network line cards, load modules, interface cards, network interface cards, data interface cards, packet engine cards, service cards, smart cards, switch cards, relay access cards, CPU cards, port cards, and others. The network cards may be referred to as blades, particularly when a processor is included on the network card. The network cards 120 may include one or more computer processors, field programmable gate arrays (FPGA), application specific integrated circuits (ASIC), programmable logic devices (PLD), programmable logic arrays (PLA), other processors, other kinds of devices, and combinations of these which comprise one or more CCDs 130. The network cards 120 may include memory such as, for example, random access memory (RAM). In addition, the network cards 120 may include software and/or firmware.

In one embodiment, each of the CCDs 130 includes a circuit, chip or chip set that allows for communication over a network as one or more network capable devices. The circuit, chip or chip set that allows for communication over a network may be referred to as a network interface. A network capable device is any device that may communicate over the network 180.

The connections 170 may be wire lines, optical fiber cables, wireless communication connections, and others, and may be a combination of these. Although only one connection 170 is shown, multiple connections with the network 180 may exist from each of the CCDs 130 in the network testing system 110.

The back plane 140 may serve as a bus or communications medium for the network cards 120. Backplane 140 may support proprietary and/or well known bus standards. In one embodiment, the back plane 140 supports a proprietary transport layer protocol. The back plane 140 may also provide power to the network cards 140. In one embodiment, the back plane 140 is replaced with an Ethernet cable or is Ethernet capable such that the internal communications of network testing system 110 are made over Ethernet. In this embodiment, the CCDs 130 and the server computing device 150 may communicate with each other using a communications protocol, such as, for example, IP, UDP, and/or TCP.

The server computing device 150 and each of the CCDs 130 may include software that may execute to achieve the techniques described herein. As used herein, "software" refers to instructions that may be executed on a computer processor. The software may be implemented in a computer language, and may be executed as object code, may be assembly or machine code, a combination of these, and others. "Software" as used herein also refers to FPGA-ware and loadable programmable logic configurations that may be used to program FPGAs and other programmable logic devices. The techniques described herein may be implemented as software in the form of one or more routines, modules, and may include lower level drivers, assembly language, object code, and other lower level software.

The software may be stored on and executed from any local or remote machine readable medium such as, for example, without limitation, magnetic media (e.g., hard disks, tape, floppy disks), optical media (e.g., CD, DVD), flash memory products (e.g., memory stick, compact flash and others), and volatile and non-volatile silicon memory products (e.g., random access memory (RAM), programmable read-only memory (PROM), electronically erasable programmable read-only memory (EEPROM), and others). A storage device is a device that allows for the reading from and/or writing to a machine readable medium. Storage devices include hard disk drives, DVD drives, flash memory devices, and others. When the method is implemented in software, the method may be executed directly from a storage device. The software, object code or other instructions implementing the method may also be transferred from a storage device to an FPGA, EEPROM or other device for execution. A network testing system 110 may be shipped with the method stored on storage device 160 and on FPGAs or other storage devices include in CCDs 130. In one embodiment, storage device 160 is a hard disk drive.

The network testing system 110 may have coupled therewith a display (not shown) and user input devices (not shown) such as a keyboard and a mouse, as well as other user input devices including, for example, pens and trackballs.

The network testing system 110 may be located physically adjacent to or remote to the devices 190 in the network 180.

The network 180 may be a local area network (LAN), a wide area network (WAN), a storage area network (SAN), or a combination of these. The network 180 may be wired, wireless, or a combination of these. The network 180 may include or be the Internet. The network 180 may be public or private, may be a segregated test network, and may be a combination of these.

Communications on the network 180 may take various forms, including frames, cells, datagrams, packets or other units of information, all of which are referred to herein as data units. A data unit may be comprised of a header and a payload. Those data units that are communicated over a network are referred to herein as network traffic. The network 180 may be comprised of numerous nodes providing numerous physical and logical paths for data units to travel. There may be plural logical communications links between the network testing system 110 and a given network capable device 190.

The network capable devices 190 may be devices capable of communicating over the network 180 and/or listening to network traffic on network 180. The network capable devices 180 may be computing devices such as computer workstations, personal computers, servers, portable computers, set-top boxes, video game systems, personal video recorders, telephones, personal digital assistants (PDAs), computing tablets, and the like; peripheral devices such as printers, scanners, facsimile machines and the like; network capable storage devices including disk drives such as network attached storage (NAS) and SAN devices; and networking devices such as routers, relays, firewalls, hubs, switches, bridges, traffic accelerators, and multiplexers. In addition, the network capable devices 180 may include appliances such as refrigerators, washing machines, and the like as well as residential or commercial heating, ventilation, and air conditioning (HVAC) systems, alarm systems, and other devices or systems capable of communicating over a network. One or more of the network capable devices 180 may be devices to be tested and may be referred to as devices under test.

Figure 2:
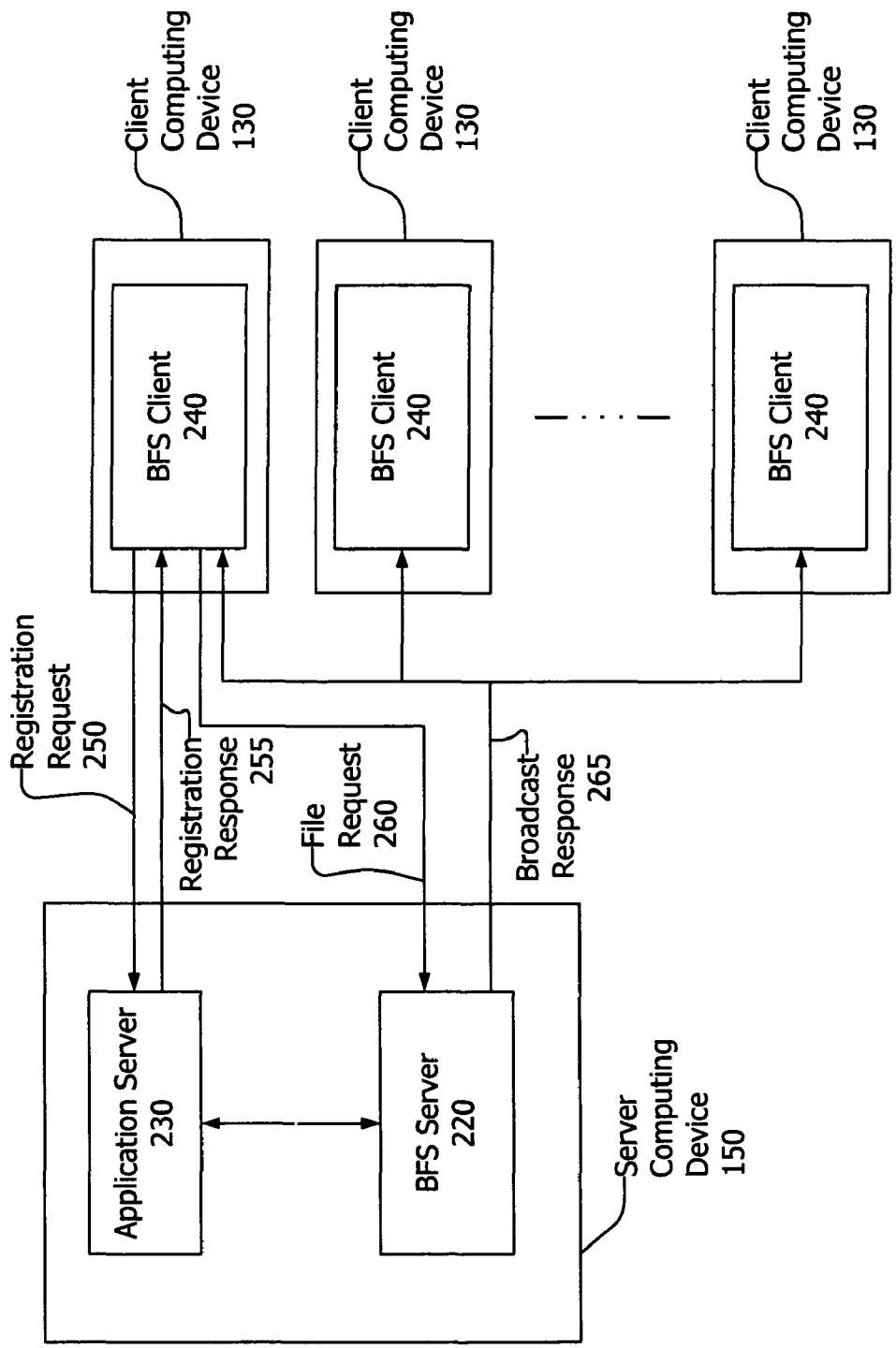
FIG. 2 is a is a functional block diagram of the components of an embodiment of a broadcast capable file system.

FIG. 2 is a is a functional block diagram of a broadcast capable file system. The functional block diagram of FIG. 2 refers to the CCDs 130 and the server computing device 150 of FIG. 1 and shows the logical connections between them. Each CCD 130 includes a broadcast file system (BFS) client 240, and the server computing device 150 include a BFS server 220 and an application server 230. As used herein a "file system" refers to software and underlying data structures that allow for the storage and retrieval of computer data in files stored locally and/or remotely on one or more storage devices and/or storage media. The "file system" may be a "network file system" or "network capable file system" that allows computer software (including application programs and operating systems) to access remote files the same way as and/or as easily as local files are accessed. The BFS client 240, BFS server 220, and the application server 230 are typically software. The BFS server 220 and the BFS client 240 may be software entities based on or enhancements to a network capable file system, such as, for example, the Network File System (NFS) of Sun Microsystems, Inc. and adopted by The Internet Society. The BFS server 220 and the application server 230 may be combined as a single logical or software entity.

When the CCDs 130 are put into an "on" state such as by powering up or restarting, each to the BFS clients 240 on each of the CCDs 130 may register with the application server 230. The registration is shown by registration request 250 which, although shown only in one instance, may occur in multiple instances. The application server 230 may process the registration request and send a separate registration response 255 to each of the registering BFS clients 240. Although shown only in one instance, registration response 255 may occur in separate multiple instances. In the registration response 255, the application server 230 may instruct the BFS clients 240 to issue future requests to the BFS server 220. In another embodiment, the registration request and response 250 and 255 do not occur, and a manual configuration, automated system defined configuration, or other configuration of the system may occur.

During start up or re-starting of the network testing system 110 and whenever reconfiguration of the network testing system 110 is performed, each of the CCDs 130 may request software in the form of application programs, boot images, and or related data, files, and portions of files needed to execute the testing functionality of the network testing system 110. In other embodiments, reconfiguration of the network testing system 110 may also occur, for example, upon the expiration of a timer, the ending of a subscription period, the occurrence of a network event, the occurrence of a testing event, and others. To obtain the necessary software, each of the CCDs 130 issues a request to the server computing device 150 for the needed software, the request is issued by the BFS clients 240 to the BFS server 220. Upon receipt of a file request 260 from one of the BFS clients 240, the BFS server prepares a broadcast response satisfying the file request and issues the broadcast response 265. The broadcast response 265 is constructed so that each of the BFS clients 240 in each of the CCDs 130 receive the software requested in the file request 260.

As used herein "broadcast" means a single transmission to multiple, unspecified recipients. As used herein "broadcast" refers to and includes either or both multicast and broadcast network transmissions. A broadcast transmission may be achieved with an Ethernet multicast packet that all CCDs 130 receive. When there are multiple groups of CCDs, the broadcast response may be broadcast to one or more of the groups of CCDs 130. This may be achieved with a single Ethernet multicast transmission that includes a group identifier (or group identifiers) that causes all CCDs 130 in a particular group receive the broadcast response 265, such that all CCDs not in the group (or groups) ignore the transmission. The broadcast transmission may be achieved, for example, by using a media access control (MAC) layer multicast address, by using an IP version 4 (IPv4) multicast address, or by any technique in which multiple nodes listen on a common bus.

Each data unit comprising the broadcast response 265 may include a header and a payload. The size of the header may be kept to a minimum. The header may include a file name describing the payload, an offset to where the payload begins, and the size of the payload of the data unit. The file name may be represented in a format that allows for a fixed data size. The file name representation may be prepared using an algorithm or technique, such as, for example, the Message-Digest Algorithm (known as MD5), Secure Hash Algorithm (SHA), and others.

The broadcast response 265 and each data unit comprising the broadcast response may also be tagged with meta data either in the header or as a data item in the payload. The meta data may identify the contents of the data unit or broadcast response by identifying a computer file or group of computer files included in the broadcast response. The meta data may identify the group of computing devices which should accept the data unit. The meta data may be of a system defined size such as, for example, 4 bits, a byte, a word (16, 32, or 64 bits), and other length of data.

The BFS server 220 maintains information concerning the file requests processed and fulfilled. The information is referred to herein as the files served history. The files served history may be maintained in a log, as a table, or as another data structure so that when a later received file request from another CCD 130 arrives, the BFS server ignores the request if the requesting CCD 130 was in the group that received the broadcast response 265. The files served history may include information concerning the last recently sent broadcast response. The BFS server 220 may also check to see if a system defined time delay has elapsed between the issuance of the broadcast response 265 and a later CCD request that corresponds to the file request 260. If the system defined time delay has not been exceeded, then the file request is ignored; if the system defined time delay has been exceeded, a broadcast response is re-prepared and re-sent.

Figure 3:
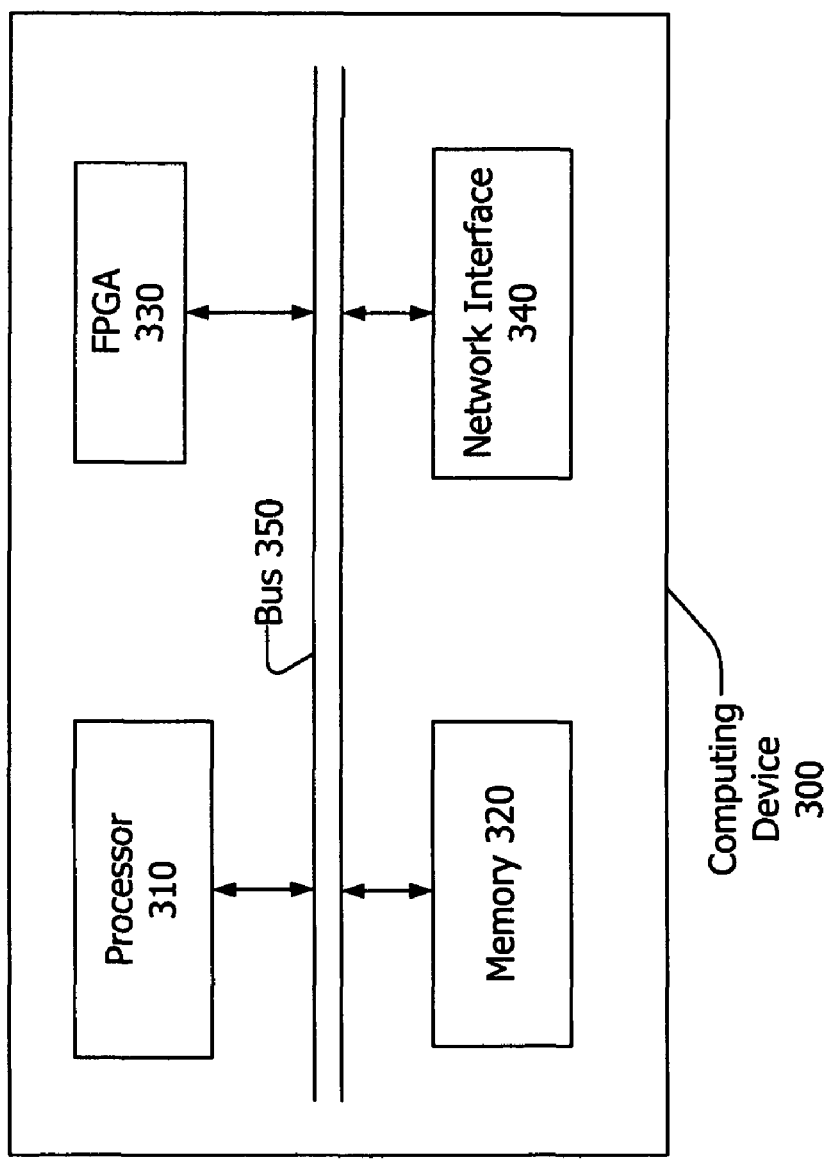
FIG. 3 is a block diagram of a computing device like the server computer device and the client computing device used in an embodiment of the invention.

FIG. 3 is a block diagram of a computing device 300 which may be the server computing device 150 and/or the CCDs 130. The computing device may be a printed circuit board having a processor 310, a memory 320, an FPGA 330 and a network interface 340 all coupled to one another via a bus 350. The processor may be any microprocessor and may be, for example, an Intel Pentium® processor or an International Business Machines Corporation (IBM) PowerPC® processor. The memory 320 may be random access memory (RAM) and may be augmented with cache memory. Although only one each of memory 320 and FPGA 330 are shown, there may be two or more of each of these components included in the computing device 300. In one embodiment, no FPGAs are included in computing device 300.

When the computing device 300 is a server computing device such as server computing device 150, the BFS server software may be included on storage device 160. When the computing device 300 is a server computing device such as server computing device 150, the computing device may be a "server on a card" or other similar device. The processor 310 and/or the FPGA 330 may execute the BFS server software.

When the computing device 300 is a client computing device such as CCD 130, the BFS client software may be included on a storage medium and/or a storage device included on or coupled with computing device 300. When the computing device 300 is a client computing device such as client computing device 130, the computing device may be a "personal computer on a card" or other similar device. The client computing device 130 may have a cache memory included therein, and the cache memory may be 1, 2, 4, 8 Mbytes in size, and may be larger or smaller. The processor 310 and/or the FPGA 330 may execute the BFS client software.

Figure 4:
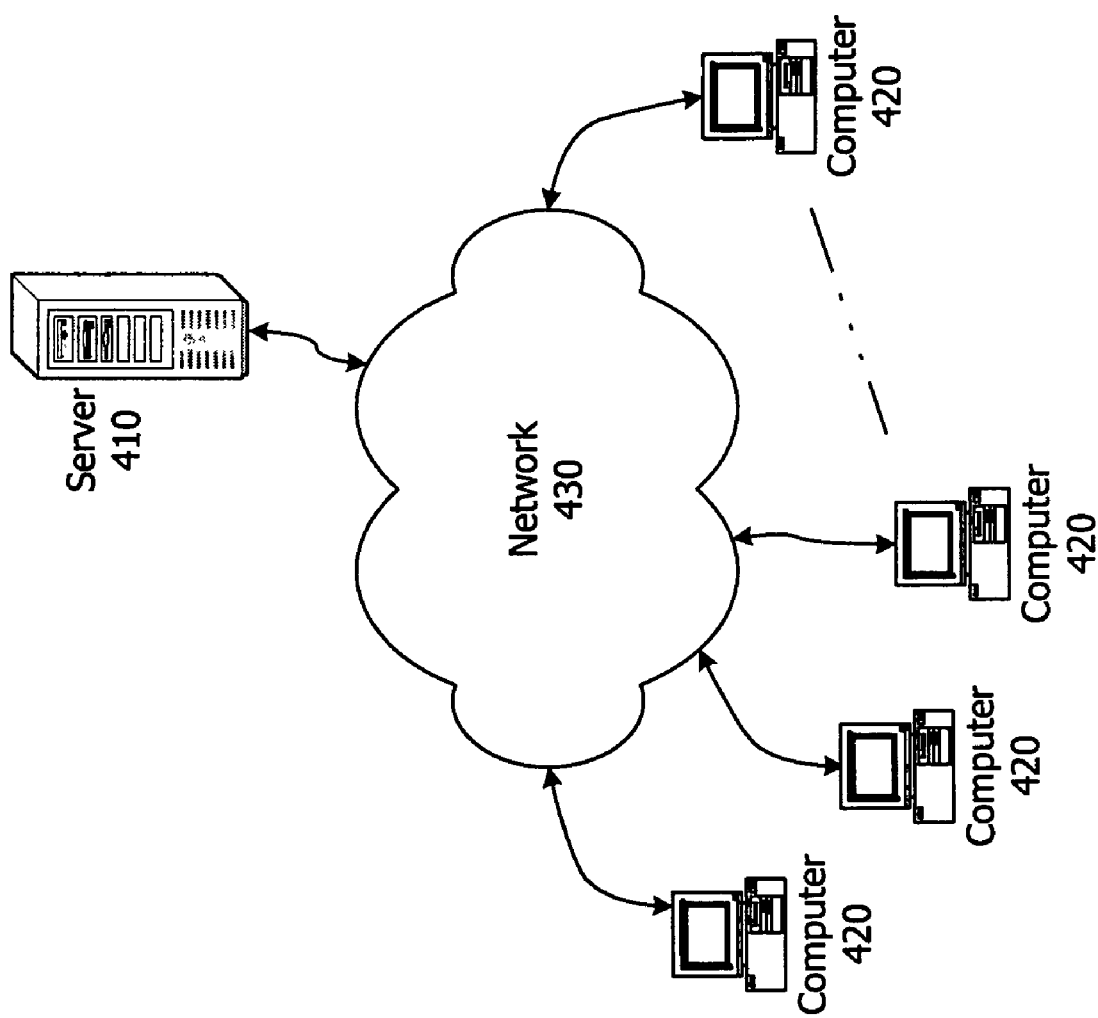
FIG. 4 is a block diagram of a second environment in which a broadcast capable file system may be implemented.

FIG. 4 is a block diagram of a second environment in which a broadcast capable file system may be implemented. The invention described herein may be extrapolated from use in a network testing system like that described above in FIG. 1 such that the broadcast capable file system may be implemented in various client/server environments. In one embodiment, a server 410 and multiple computers 420 are coupled to and communicate over network 430. The server 410 may be a group of servers. The computers 420 run BFS client software and the server 410 runs BFS server software. The server 410 may be or include software that allows the server 410 or group of servers to act as applications servers, graphics servers, database server, and other servers. The computers 420 may be computing devices, and, in particular, personal computers, computer workstations, notebook computers, computing tablets, PDAs, set top boxes, video game systems, personal video recorders, and others. The network 430 may be wired, wireless, or a combination of these. The network 430 may support the Ethernet standard and may support one or more lower level and higher level communications standards and protocols.

In one implementation, a company, school or other organization may have one or more groups of similarly configured computers such as computer 420. When one of the computers 420 in a group requests additional software, a software upgrade or a revised data file or other computer file, the server 410 may automatically issue a broadcast response accessible to all computers 420 in the group of which the requesting computer is a member. In this way, uniformity of the software installed among the computers in a group remains consistent and occurs within close temporal proximity. As used herein a "computer file" may be or contain an application program, a boot image, an application program upgrade, an operating system utility program, object code, executable code, test scripts, test data, and other software, as well as blocks, fragments, segments and other portions thereof.

Description of the Methods

Figure 5:
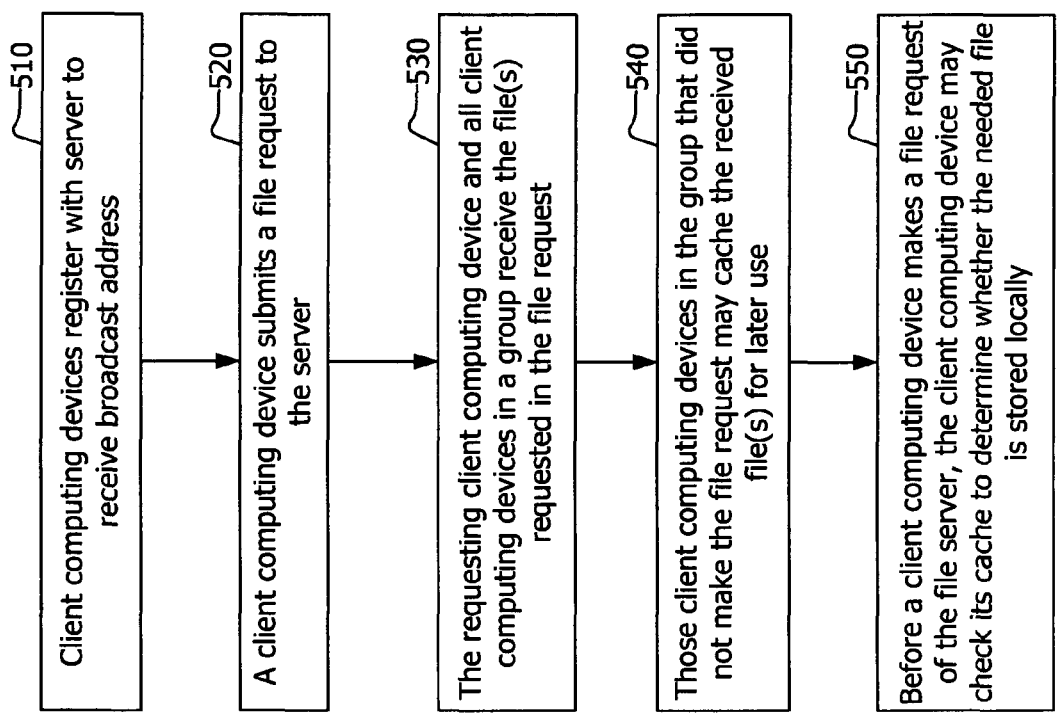
FIG. 5 is a flow chart of the actions taken by a client computing device according to the broadcast capable file system described herein.

FIG. 5 is a flow chart of the actions taken by a client computing device according to the broadcast capable file system described herein. One or more client computing devices may register with a server to obtain broadcast addresses, as shown in block 510. In one embodiment, the client computing device uses an operating system call to register the broadcast address—which may be an Ethernet multicast address, and IPv4 address and others—provided by the server. One of the client computing devices submits a file request to the server, as shown in block 520. The file request may be for a boot image, one or more executable application programs, a test suite, scripts, data files, other computer files, and/or a combination of these and others. The file request may be for a portion of a file, such as, for example, a file block, file fragment or file segment. The file request may be a request for any kind of data that me be transmitted in binary form, such as for example, a copy of the data included in a shared memory location. As such, the file request may be a data request, and the methods described herein may be used to dynamically transfer data during operation of a system and/or of computing devices.

The requesting client computing device and all client computing devices in a group receive the file requested in the file request, as shown in block 530. Each of the computing devices in the group may check the received data units to evaluate whether the file or files constructed from the received data units are appropriate for the receiving computing device. Some or all of the client computing devices in the group that did not make the file request may cache the received data units for later use, as shown in block 540.

Before a client computing device makes a file request of the file server, the client computing device may check its cache to determine whether the needed file is stored locally, as shown in block 550. If the needed file is stored locally, the computing device does not request the needed file from the server but retrieves the needed file from its cache. The flow of actions may loop back to block 520. Further, block 550 may be included between blocks 510 and 520.

Figure 6:
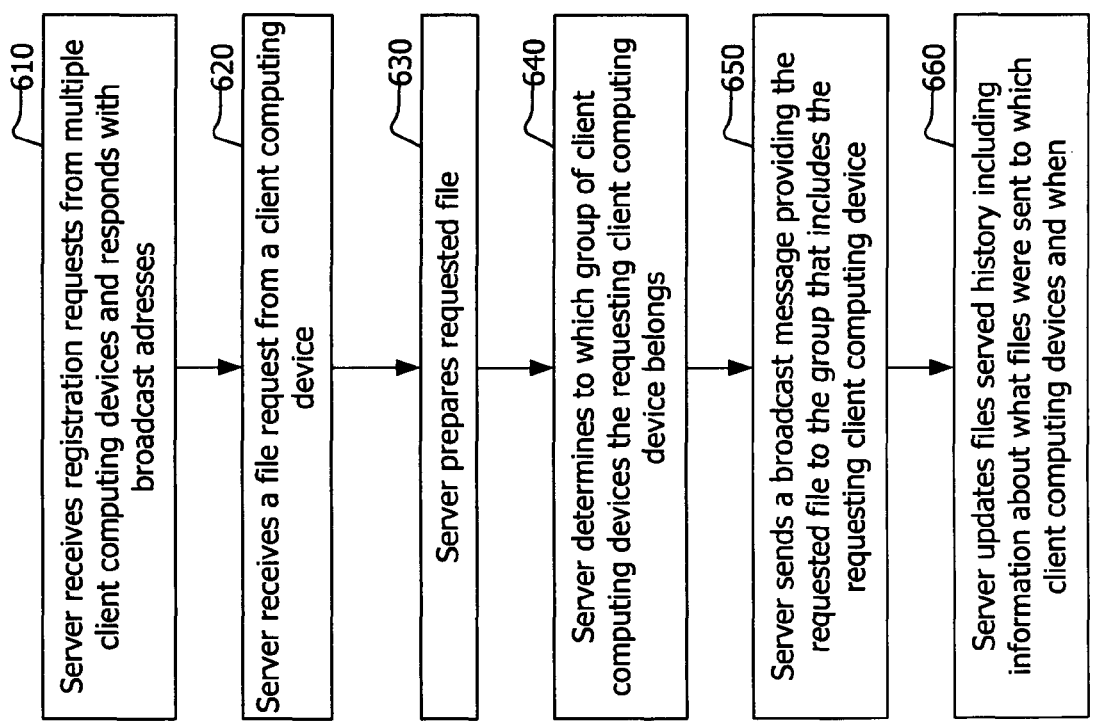
FIG. 6 is a flow chart of the actions taken by a server computing device according to the broadcast capable file system described herein.

FIG. 6 is a flow chart of the actions taken by a server computing device according to the broadcast capable file system described herein. A server receives registration requests from multiple client computing devices and responds with broadcast addresses, as shown in block 610. The server may also provide other information in response to the registration requests. The server may receive a file request from a client computing device, as shown in block 620. The file request may specify a particular file, multiple files, or portions of a file, such as, for example, file segments, file blocks, and file fragments. The server prepares the requested file, files, or file portion, as shown in block 630. The server determines to which group of client computing devices the requesting client computing device belongs, as shown in block 640. In one embodiment, there is only a single group, and all client computing devices are members of the group.

The server sends a broadcast message providing the requested file, files, or file portion to the group that includes the requesting client computing device, as shown in block 650. If there is only a single group, then all client computing devices receive the requested file or files. The server updates the files served history which includes information about when files were sent and what files were sent to which client computing devices, as shown in block 660. The files served history may include information about which file blocks, segments, fragments or other portion of a file that was served. The flow of actions may loop back to block 620.

In addition, between blocks 620 and 630, the server may evaluate the file request to determine whether the requesting client computing device and the requested file or file portion were recently provided to a group that includes the requesting client computing device. This may be or include a check of least recently served information stored in a log or other data structure maintained by the server. If a broadcast response fulfilling the file request was recently served to the group of which the requesting client computing device is a member, the server ignores the file request. In making this evaluation, the server may also consider whether a system defined period of time has expired since the last recently served broadcast response was issued. If the period of time has been exceeded, the server may prepare and send a broadcast response as set forth in blocks 630, 640, 650, and 660. If the period of time has not been exceeded, no response to the file request is provided.

With regard to FIGS. 5 and 6, additional and fewer steps may be taken, and the steps as shown may be combined or further refined to achieve the methods described herein.

Although exemplary embodiments of the invention have been shown and described, it will be apparent to those having ordinary skill in the art that a number of changes, modifications, or alterations to the invention as described herein may be made, none of which depart from the spirit of the invention. All such changes, modifications and alterations should therefore be seen as within the scope of the invention.

It is claimed:

1. A method comprising:
   receiving registration requests from multiple client computing devices;
   responding to the registration requests with broadcast addresses;
   receiving a file request from a requesting client computing device, the requesting client computing device included in a first group of multiple groups of client computing devices, wherein the first group of client computing devices includes less than all client computing devices;
   preparing a broadcast response to the file request, the broadcast response including a requested computer file specified in the file request, the broadcast response directed to the first group of client computing devices of which the requesting client computing device is a member;
   issuing the broadcast response.

2. The method of claim 1 wherein the receiving and the issuing are performed over a backplane.

3. The method of claim 1 wherein the receiving and the issuing are performed over a network.

4. The method of claim 1 wherein the broadcast response includes meta data identifying the requested computer file included in the broadcast response and/or the first group of client computing devices.

5. The method of claim 1 further comprising:
   checking to determine whether the requested computer file specified in the file request has recently been sent
   performing the preparing and the issuing when the checking shows that the requested computer file specified in the file request has not recently been sent.

6. The method of claim 5 wherein the checking is based on a system defined time period.

7. The method of claim 1 further comprising:
   updating a data structure containing pertinent data about the broadcast response.

8. The method of claim 7 wherein the pertinent data includes one or more of a content identifier of what was sent in the broadcast response, a time when the broadcast response was sent, a group identifier identifying the group to which the broadcast response was sent.

9. The method of claim 1 implemented in a server computing device included in a network testing system.

10. The method of claim 1 implemented in a server computing device coupled to a network.

11. A method comprising:
    at least one client computing device of a first group of client computing devices registering with a server computing device to receive broadcast addresses;
    the at least one client computing device submitting a file request to the server computing device, wherein the first group of client computing devices is one group of multiple groups of client computing devices and wherein the first group of client computing devices includes less than all client computing devices;
    each of the client computing devices of the first group of client computing devices receiving a broadcast response to the file request, the broadcast response including a requested computer file, wherein the broadcast response is directed only to the first group of client computing devices of which the requesting client computing device is a member.

12. The method of claim 11 further comprising:
    each of the client computing devices of the first group of client computing devices registering with the server computing device.

13. The method of claim 11 further comprising:
    some of the client computing devices of the first group of client computing devices caching the broadcast response.

14. The method of claim 13 wherein the caching comprises:
    checking whether the broadcast response is appropriate for the client computing device such that the caching is performed when the broadcast response is appropriate for the client computing device.

15. The method of claim 14 wherein the checking comprises:
    evaluating meta data included in the broadcast response.

16. The method of claim 15 wherein the meta data identifies the requested computer file included in the broadcast response and/or the group of client computing devices.

17. The method of claim 11 further comprising:
    checking a cache to evaluate whether a needed file is located in the cache such that the submitting is not performed when the needed file is located in the cache.

18. The method of claim 11 wherein the broadcast response includes meta data identifying the requested computer file included in the broadcast response and/or the group of client computing devices.

19. The method of claim 11 wherein the server computing device and the client computing devices are included in a network testing system.

20. The method of claim 11 wherein the server computing device and the client computing device are coupled to and communicate over a network.

21. A method for a broadcast capable file system comprising:
    at least one client computing device of a first group of client computing devices registering with a server computing device to receive broadcast addresses;
    the client computing device submitting a file request to the server computing device, wherein the first group of client computing devices is one group of multiple groups of client computing devices and wherein the first group of client computing devices includes less than all client computing devices;
    the server computing device receiving the file request from a requesting client computing device;
    the server computing device preparing a broadcast response to the file request, the broadcast response including a requested computer file, wherein the broadcast response is directed to the first group of client computing devices of which the requesting client computing device is a member;
    the server computing device issuing the broadcast response;
    each of the client computing devices of the first group of client computing devices receiving the broadcast response.

22. The method of claim 21 further comprising:
    each client computing device of the client computing devices registering with the server computing device.

23. The method of claim 21 wherein the receiving the file request, the issuing the broadcast response, and the receiving the broadcast response are performed over a backplane.

24. The method of claim 21 wherein the receiving the file request, the issuing the broadcast response, and the receiving the broadcast response are performed over a network.

25. The method of claim 21 wherein the broadcast response further includes one or more of a file block and a file fragment.

26. The method of claim 21 wherein the broadcast response includes meta data identifying the requested computer file included in the broadcast response and/or identifying the group of client computing devices.

27. The method of claim 21 further comprising:
the server computing device checking to determine whether the requested computer file specified in the file request has recently been sent
performing the preparing and the issuing when the checking shows that the requested computer file specified in the file request has not recently been sent.

28. The method of claim 27 wherein the checking is based on a system defined time period.

29. The method of claim 21 further comprising:
the server computing device updating a data structure containing pertinent data about the broadcast response, the pertinent data including one or more of a content identifier of what was sent in the broadcast response, a time when the broadcast response was sent, or a group identifier of to whom the broadcast response was sent.

30. The method of claim 21 further comprising:
some of the client computing devices caching the broadcast response.

31. The method of claim 30 wherein the caching comprises:
checking whether the broadcast response is appropriate for the client computing device such that the caching is performed when the broadcast response is appropriate for the client computing device.

32. The method of claim 31 wherein the checking comprises:
evaluating meta data included in the broadcast response, wherein the meta data identifies the requested computer file included in the broadcast response and/or identifies the group of client computing devices.

33. The method of claim 21 further comprising:
the client computing devices checking a cache to evaluate whether a needed file is located in the cache such that the submitting is not performed when the needed file is located in the cache.

34. The method of claim 21 wherein the broadcast response includes meta data identifying the requested computer file included in the broadcast response and/or the first group of client computing devices.

35. The method of claim 21 wherein the server computing device and the client computing devices are included in a network testing system.

36. A network testing system comprising a plurality of network cards coupled to a back plane, each of the network cards including a plurality of client computing devices, a server computing device coupled to a storage device and the back plane, the server computing device comprising:
a processor coupled to a bus;
a memory coupled to the bus;
the memory having instructions stored thereon which when executed by the processor cause the server computing device to perform actions comprising:
receiving registration requests from multiple of the client computing devices;
responding to the registration requests with broadcast addresses;
receiving a file request from a requesting client computing device, the requesting client computing device included in a first group of client computing devices of multiple groups of client computing devices, wherein the first group of client computing devices includes less than all client computing devices;
preparing a broadcast response to the file request, the broadcast response including a requested computer file specified in the file request, the broadcast response directed to the first group of client computing devices of which the requesting client computing device is a member;
issuing the broadcast response.

37. The network testing system of claim 36 wherein the broadcast response includes meta data identifying the requested computer file included in the broadcast response and/or the first group of client computing devices.

38. The network testing system of claim 36 wherein the memory has further instructions stored thereon which when executed by the processor cause the server computing device to perform further actions comprising:
checking to determine whether the requested computer file specified in the file request has recently been sent;
performing the preparing and the issuing when the checking shows that the requested computer file specified in the file request has not recently been sent.

39. The network testing system of claim 38 wherein the checking is based on a system defined time period.

40. The network testing system of claim 36 wherein the memory has further instructions stored thereon which when executed by the processor cause the server computing device to perform further actions comprising:
updating a data structure containing pertinent data about the broadcast response, the pertinent data including one or more of a content identifier of what was sent in the broadcast response, a time when the broadcast response was sent, or a group identifier identifying the group to which the broadcast response was sent.

41. A network testing system comprising a server computing device coupled to a storage device and a back plane, a plurality of network cards coupled to the back plane, each of the network cards including a plurality of client computing devices, each of the client computing devices comprising:
a processor coupled to a bus;
a memory coupled to the bus;
the memory having instructions stored thereon which when executed by the processor cause the client computing device to perform actions comprising:
at least one client computing device of a first group of client computing devices registering with the server computing device to receive broadcast addresses;
the at least one of the client computing device submitting a file request to the server computing device, wherein the first group of client computing devices is one group of multiple groups of client computing devices and wherein the first group of client computing devices includes less than all client computing devices included in the network testing system;
each of the client computing devices of the first group of client computing devices receiving a broadcast response to the file request, the broadcast response including a requested computer file.

42. The network testing system of claim 41 wherein the memory has further instructions stored thereon which when executed by the processor cause the client computing device to perform further actions comprising:
some of the client computing devices caching the broadcast response.

43. The network testing system of claim 42 wherein the caching comprises:
checking whether the broadcast response is appropriate for the client computing device such that the caching is performed when the broadcast response is appropriate for the client computing device.

44. The network testing system of claim 43 wherein the checking comprises:
evaluating meta data included in the broadcast response, wherein the meta data identifies the requested computer file included in the broadcast response and/or the group of client computing devices.

45. The network testing system of claim 41 wherein the memory has further instructions stored thereon which when executed by the processor cause the client computing device to perform further actions comprising:

checking a cache to evaluate whether a needed file is located in the cache such that the submitting is not performed when the needed file is located in the cache.

46. The network testing system of claim 41 wherein the broadcast response includes meta data identifying the requested computer file included in the broadcast response and/or the group of client computing devices.

* * * * *